C. J. RATEIKE.
PIPE COUPLING.
APPLICATION FILED SEPT. 9, 1914.

1,193,923.

Patented Aug. 8, 1916.

Witnesses:

Inventor
Charles J. Rateike
By his Attorney

UNITED STATES PATENT OFFICE.

CHARLES J. RATEIKE, OF CHICAGO, ILLINOIS, ASSIGNOR TO CYRUS MARK, ANSON MARK, AND CLAYTON MARK, COPARTNERS DOING BUSINESS AS MARK MANUFACTURING COMPANY, OF CHICAGO, ILLINOIS.

PIPE-COUPLING.

1,193,923.   Specification of Letters Patent.   Patented Aug. 8, 1916.

Application filed September 9, 1914. Serial No. 860,838.

*To all whom it may concern:*

Be it known that I, CHARLES J. RATEIKE, a citizen of the United States, and a resident of Chicago, Cook county, Illinois, have invented new and useful Improvements in Pipe-Couplings, of which the following is a specification, reference being had to the accompanying drawings, in which—

Figure 1:
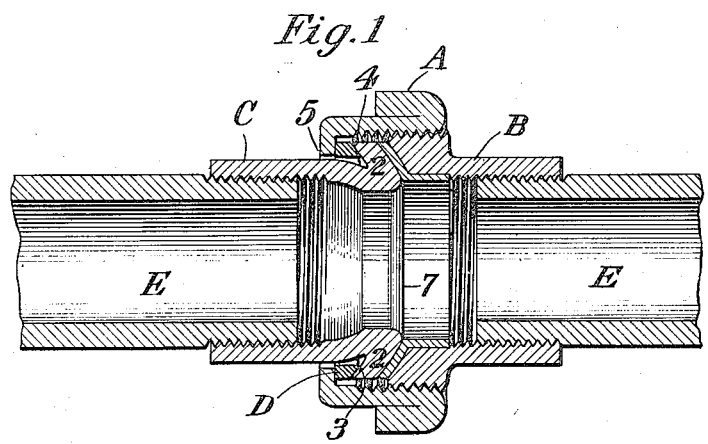
Figure 2:
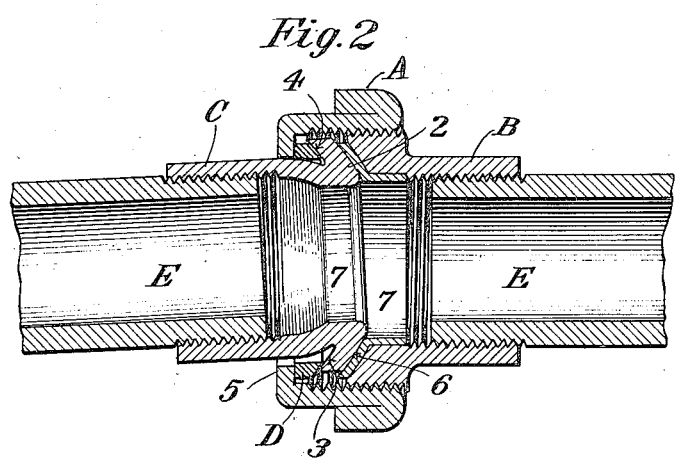
Figure 3:
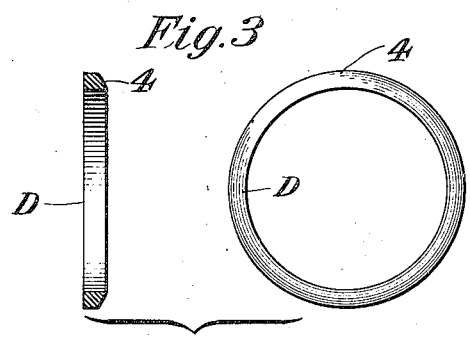

Figure 1 is a section of a coupling embodying my invention; Fig. 2 is a section showing the coupling joining pipes out of alinement with each other, and Fig. 3 shows details of the compensating member.

My invention relates to pipe couplings and consists in providing means whereby the strains imposed upon the coupling when used for connecting pipes out of alinement with each other are equalized, thereby enabling a tight joint to be made.

My invention also consists in the construction and coöperation of the parts, which I shall hereinafter describe and claim.

Referring to the drawings, A is the coupling nut, B the head piece and C the tail piece, D the ring-shaped compensating member and E the pipes to be connected by the coupling. The tail piece C has a flange 2, the rear face 3 of which is concave, to coöperate with the corresponding beveled or convex face 4 of the compensating member D. The rear face of the member D bears against the inwardly-extending lip 5 of the coupling nut A.

The position of the coupling when assembled, connecting the pipes E, is shown in Fig. 1, in which the pipes E are in alinement. Frequently, however, the pipes E to be joined are somewhat out of alinement, as is shown in Fig. 2.

When the ordinary pipe coupling is used to connect pipes out of alinement, the tail piece C tilts by its flange 2 upon the inwardly-extending lip 5 of the nut A, so that a part of the flange 2 has no supporting bearing on the lip 5 of the coupling nut A, with the result that as soon as a substantial pressure is applied to the joint it is extremely apt to leak at the point 6 (indicated in Fig. 2), because there is no support behind this point 6 to hold the nose 7 of the tail piece C against the corresponding bearing face of the head piece B. When, however, the compensating member D of my invention is employed, it provides a support for the tail piece, so that its nose 7 will have a firm bearing against the corresponding face of the head piece at all points. When the pipes E are joined at an angle, as is shown in Fig. 2, the concave face 3 on the flange 2 of the tail piece at one side of the joint will ride up the convex face 4 of the compensating member B, as is indicated at the lower side of Fig. 2, while at the opposite side of the joint the flange 2 will move a corresponding distance outwardly over the compensating member D, compressing it inwardly against the side of the tail piece, and the intermediate portions of the flange will have a corresponding bearing on the ring D, between the two points shown in Fig. 2. The ring D thus provides a solid support for the flange 2 of the tail piece C at all points in its circumference, which prevents the tail piece C from being forced away from the head piece B at any point when the coupling is under pressure, and thus avoids resulting leakage in the joint.

I have found that by the use of my compensating member D the efficiency of my coupling is increased to a very marked degree and enables it to be used for very high pressures without leakage. Another advantage resulting from its use is that stripping or breaking of the threads on the coupling nut A and head piece B, which frequently occurs with ordinary couplings laid out of line, is avoided by reason of the fact that the strains imposed upon the lip 5 of the coupling nut by the compensating ring are substantially equalized.

It is obvious that various modifications may be made in the construction which I have shown and described without departing from my invention.

What I claim is:

1. In a pipe coupling, a head piece, a tail piece having an outwardly-extending flange, a coupling nut having an inwardly extending lip and a compensating member bearing on said flange and said lip, the compensating member having a convex face co-acting with a correspondingly shaped face on the under side of said flange, and being adapted to provide a firm bearing between the tail piece and the coupling nut when these parts are brought together out of alinement.

2. In a pipe coupling, a head piece, a coupling nut, and a tail piece having a flange extending outwardly at an angle to the tail piece, and forming between the flange and body portion an annular recess, a compensating member having a bearing on the coupling nut on one side and a bearing upon said tail piece within said recess on the other, said compensating member being adapted to provide a bearing between the several parts when the coupling nut and the tail piece are drawn up out of alinement with each other.

CHARLES J. RATEIKE.

Witnesses:
CLARENCE MARY,
BESS PETERSON.